P. DI MAGGIO.
STAY BOLT.
APPLICATION FILED NOV. 30, 1915.
1,191,676. Patented July 18, 1916.
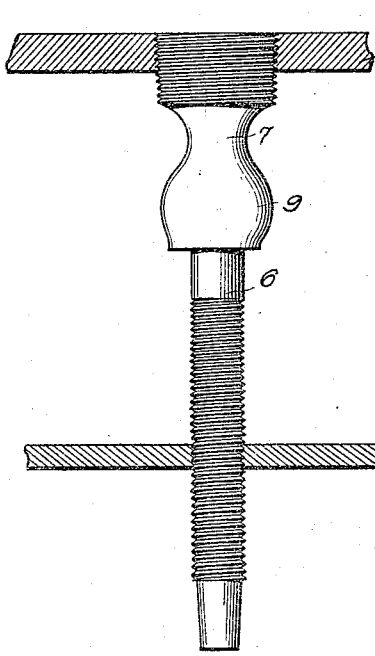
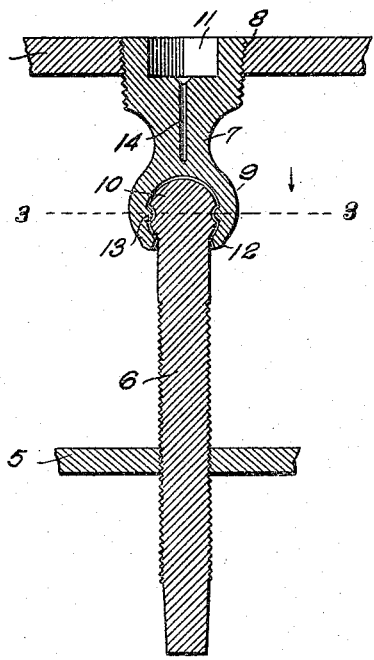
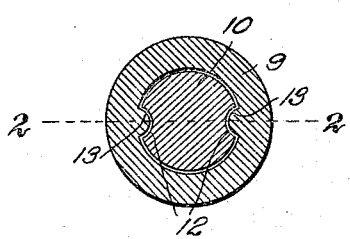
WITNESSES
INVENTOR
P. Di Maggio
BY
ATTORNEYS

UNITED STATES PATENT OFFICE.

PHILIP DI MAGGIO, OF ALBANY, NEW YORK.

STAY-BOLT.

1,191,676.  Specification of Letters Patent.  Patented July 18, 1916.

Application filed November 30, 1915. Serial No. 64,242.

*To all whom it may concern:*

Be it known that I, PHILIP DI MAGGIO, a subject of the King of Italy, and a resident of Albany, in the county of Albany and State of New York, have invented a new and Improved Stay-Bolt, of which the following is a full, clear, and exact description.

My invention relates to flexible stay bolts for connecting the inner and outer sheets of steam boilers.

An object thereof is to provide a simple, strong and inexpensive bolt adapted to be used in boilers having straight or curved surfaces and subjected to high pressure of steam.

A further object of the invention is to produce a stay bolt which may be used efficiently and without undue strain upon it when interengaging holes in a fire box which are not in perfect alinement.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a section through a boiler equipped with a stay-bolt structure in accordance with my invention, the bolt being shown in elevation; Fig. 2 is a longitudinal section through the stay bolt on line 2—2 Fig. 3; and Fig. 3 is a horizontal section on line 3—3, Fig. 2.

Referring to the drawings, 4 represents a boiler sheet and 5, a fire-box sheet maintained in proper spaced relation by a flexible bolt having a bolt section 6 and a plug section 7. The plug 7 is threaded into an opening 8 in the boiler sheet. The opening is large enough to admit a spherical socket 9 of the plug. The socket engages a spherical head 10 of the bolt section 6 which bolt has a threaded portion for engaging the firebox sheet 5. A recess 11 is provided in the socket for a wrench for manipulating the socket.

The spherical head 10 of the bolt is provided with diametrically opposite semispherical depressions or recesses 12 engaging by similar projections 13 in the spherical socket 9. This engagement of the projections with the recesses will prevent the bolt from turning relative to the socket, and vice-versa, but it will not prevent the bolt from swinging in the socket; consequently, the bolt section 6 can be screwed through the medium of the socket 9 into the fire-box sheet 5. It is apparent from the drawings that there will always be sufficient play between the bolt section 6 and the socket 9 to prevent any lateral strain on the bolt, although the bolt section and the socket are keyed together through the medium of the spherical projections and recesses, as previously stated. The plug 7 is provided with a telltale bore 14 extending from the wrench recess 11 toward the socket 9 of the plug. The bolt can be hammer tested, and the plug 7 setting flush permits the use of the bolt in all parts of the boiler.

I claim:

A flexible stay bolt comprising a bolt section having a spherical head, and a threaded plug having a spherical socket engaging the spherical head of the bolt, said spherical head of the bolt having diametrically opposite hemispherical recesses on the curved surface, and hemispherical projections in the periphery of the spherical socket engaging said recesses of the head.

In testimony whereof I have signed my name to this specification in the presence of two subscribing witnesses.

PHILIP DI MAGGIO.

Witnesses:
 ALBERT E. STIYLMEIN,
 JAMES T. COOK, Jr.

Copies of this patent may be obtained for five cents each, by addressing the "Commissioner of Patents, Washington, D. C."